United States Patent [19]
Wagner

[11] 3,783,921
[45] Jan. 8, 1974

[54] SCREW FASTENER AND METHOD OF APPLYING SAME

[75] Inventor: David P. Wagner, Elmhurst, Ill.

[73] Assignee: Illinois Tool Works Inc., Chicago, Ill.

[22] Filed: Apr. 1, 1971

[21] Appl. No.: 130,199

[52] U.S. Cl.................. 151/41.7, 85/82, 339/246
[51] Int. Cl............................................. F16b 37/04
[58] Field of Search..................... 151/41.7, 14.5;
85/1 C, 63, 12 P, 82; 264/318, 248;
156/303.1; 287/20.2 R; 339/246

[56]  References Cited
UNITED STATES PATENTS

| | | | |
|---|---|---|---|
| 3,238,495 | 3/1966 | Lanius | 339/246 |
| 2,399,526 | 4/1946 | Warren | 85/1 C |
| 2,980,966 | 4/1961 | Praeg | 264/318 |
| 3,061,888 | 11/1962 | Wadham | 264/318 |
| 3,179,143 | 4/1965 | Schultz et al. | 151/41.7 |
| 3,417,653 | 12/1968 | Staats et al. | 85/63 |
| 3,639,137 | 2/1972 | Marinelli | 85/1 C |
| 3,177,456 | 4/1965 | Haydo | 85/50 R |

FOREIGN PATENTS OR APPLICATIONS

| | | | |
|---|---|---|---|
| 164,195 | 7/1955 | Australia | 85/1 C |
| 234,402 | 5/1925 | Great Britain | 85/82 |
| 103,790 | 5/1938 | Australia | 85/63 |

*Primary Examiner*—Edward C. Allen

[57]  ABSTRACT

The present invention relates generally to improvements in screw type fasteners and to novel methods of applying such fasteners to a preformed aperture in a workpiece. The embodiments of the present invention disclosed in the accompanying drawing includes a headed screw member, the entering extremity of which is encapsulated by an adhesive having the functional characteristics of a partially cured epoxy resin. Interposed between the threaded peripheral surface of the screw shank and the aforesaid adhesive is a release coating to prevent the establishment of a bond between the adhesive and the peripheral screw surface when said adhesive is completely cured or solidified within a work aperture.

3 Claims, 9 Drawing Figures

PATENTED JAN 8 1974 3,783,921

INVENTOR
DAVID P. WAGNER

By Olson, Trexler, Wolters & Bushnell
Atty's 3,783,921

SCREW FASTENER AND METHOD OF APPLYING SAME

SUMMARY OF THE INVENTION

It is an object of the present invention to provide a screw type fastener which may be employed in instances where the structural nature of a workpiece is such as not to lend itself readily for the direct application of a conventional screw. For example, in relatively soft woods or in material such as concrete, it is often not feasible to apply a conventional screw member to a preformed aperture. The present invention, therefore, contemplates the provision of a novel screw threaded fastener which may be conveniently and uniquely mounted within the aperture of a workpiece which ordinarily would not accommodate the direct application of a shank of a conventional screw member.

More specifically, the invention contemplates an arrangement whereby an adhesive having the functional characteristics of an epoxy resin, may be associated with the threaded shank of a screw member in such a manner as to enable the combined screw shank and adhesive as a unit to be applied to a work aperture so as to establish a bond with the apertured workpiece but without establishing a bond with the threaded periphery of the screw shank.

Thus, the present invention contemplates a novel combination with an encapsulating adhesive having the functional characteristics of an epoxy resin, without establishing a permanent bond between the adhesive and the threaded periphery of the screw shank.

BRIEF DESCRIPTION OF THE DRAWING

The foregoing and other objects and advantages will be more apparent from the following detailed description when considered in connection with the accompanying drawings wherein.

DESCRIPTION OF THE PREFERRED EMBODIMENTS

Figure 1:
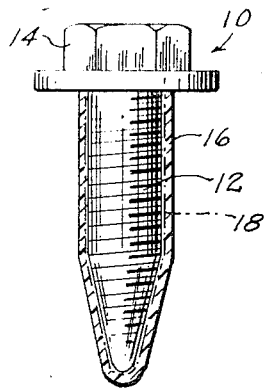
FIG. 1 is a side elevational view shown partly in section of a screw threaded fastener encapsulated by an adhesive in accordance with the teachings of the present invention.
Figure 2:
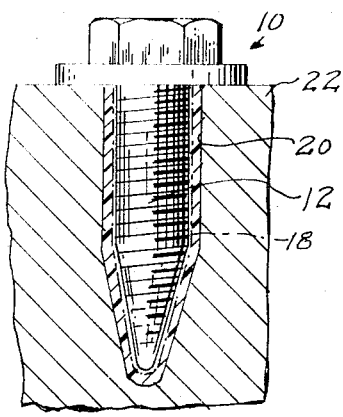
FIG. 2 discloses the fastener of FIG. 1, mounted within an apertured workpiece.

FIGS. 1 and 2 disclose a fastener member designated generally by the numeral 10, which is representative of one embodiment of the present invention. The fastener 10 includes a threaded shank 12 and a head 14. Encapsulating the threaded shank 12 is an adhesive covering 16, such as a partially cured epoxy resin. Interposed between the adhesive covering 16 and the periphery of the shank 12, is a screw release coating 18, indicated by dot and dash lines.

Epoxy resins of the type contemplated hereby characteristically react in three stages commonly referred to as stages A, B and C. The A stage is an early stage in the reaction of the epoxy in which it is uncured and therefore soluble in certain liquids and also fusible. The B stage is an intermediate stage in the reaction in which the epoxy is partially cured and will soften when heated. In the final, or C stage, the cross-linkage or curing is complete and the resulting composition is relatively insoluble and unfusible. It should be understood, therefore, that the adhesive covering 16 may be an epoxy resin in its B stage of reaction. Thus the partially cured adhesive coating 16 and the intermediate release coating adjacently encapsulate the threads of the screw shank 12.

Figure 3:
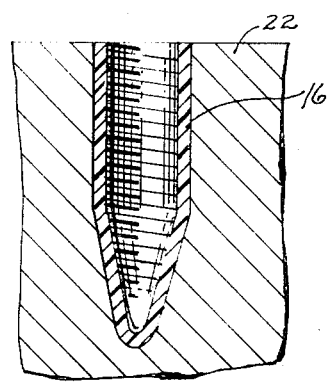
FIG. 3 is a sectional view similar to FIG. 2, with the screw member removed therefrom after the adhesive has been completely cured.

The fastener 10 is adapted to be inserted within an aperture 20 of a workpiece 22 as clearly shown in FIG. 2. By subjecting the adhesive covering 16 to heat, it will melt and flow into contact with the surface of the workpiece defining the aperture 20. Upon solidifying, the covering 16 presents a tough, hardened wall having internal thread convolutions complementing the external threads of the shank 12 as clearly shown in FIG. 3. The presence of the release coating 18 permits the fastener 10 to be removed without disturbing the firmly held adhesive covering 16. The release coating 18, may be of the type known as a mold release compound commonly employed in molding plastic materials. The presence of such mold release compound facilitates the ease with which the molded plastic part or object may be removed from a mold. Thus the adhesive or epoxy resin covering 16 as shown in FIG. 3, is in its final or C stage of reaction; namely, fully cured, and therefore is substantially infusible.

Figure 4:
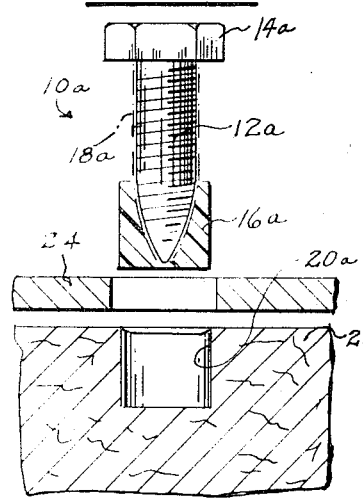
FIG. 4 discloses a modified combination of a screw member and adhesive, said parts being disclosed in readiness for insertion within a preformed work aperture.
Figure 5:
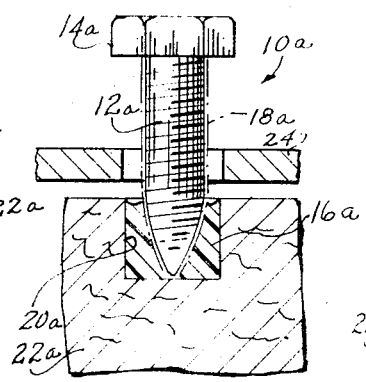
FIG. 5 is a view similar to FIG. 4, disclosing the initial position of insertion within a work aperture of the combined screw member and adhesive.
Figure 6:
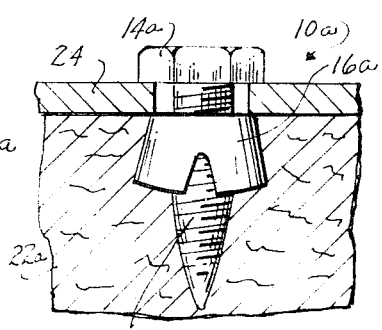
FIG. 6 is a view similar to FIGS. 4 and 5, disclosing the screw element in its final position of association with the work.

FIGS. 4, 5 and 6, disclosed a fastener designated generally by the numeral 10a which is representative of another embodiment of the present invention. Fastener 10a includes a screw member having a threaded shank 12a, a head 14a, and a section of adhesive material 16a encapsulating the extreme tapered extremity of the shank 12a. Distributed over the entire axial extent of the shank 12a is a coating 18a of mold release material similar to the previously described release material 18. A workpiece 22a is provided with an aperture 20a for accommodating the entering extremity of the screw shank and the encapsulating block of adhesive material 16a, as illustrated in FIG. 5. The adhesive covering 16a, like the previously described covering 16, has the functional characteristics of an epoxy resin. Thus the covering or section 16a as shown in FIG. 4, may correctly be defined as a B stage epoxy resin. In FIG. 5, the entering end of the screw and the adhesive section associated therewith have been initially inserted within the work aperture 20a. By subjecting the adhesive 16a to heat, it may be transformed to the C stage of solidification. In this condition the adhesive material lockingly engages the surface of the workpiece defining the aperture 20a. Presence of the release material 18a prevents locking impingement of the adhesive with the entering thread convolutions of the screw shank thus permitting continued rotative tightening of the screw shank which ultimately causes the lower portion of the encircling adhesive material to be flared outwardly as shown in FIG. 6. The head 14a of the screw member may now be clamped tightly against a work panel 24 so as to secure said panel to the workpiece 22a. Flaring the adhesive material 16a outwardly causes it to become embedded within the softer material of the workpiece. Thus the fastener 10a is particularly adapted for use in relatively soft work material such as wood and the like. Due to the presence of the mold release material 18a, the threaded shank 12a may be removed without disturbing the interlocking association of the adhesive material 16a with the workpiece 22a.

Figure 7:
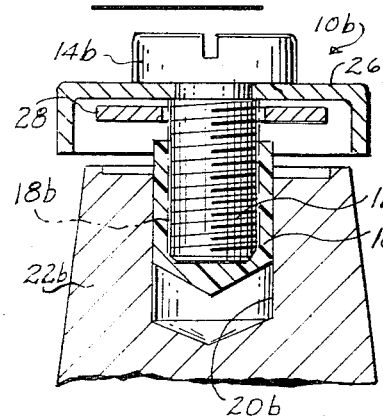
FIG. 7 discloses the invention as applied to a screw and electrical terminal assembly during the initial insertion of the encapsulated extremity of the screw member within the aperture of a workpiece.
Figure 8:
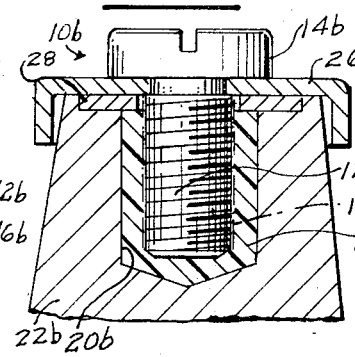
FIG. 8 is a view similar to FIG. 7, disclosing the final position of the screw member within the workpiece; and, FIG. 9 is a view similar to FIG. 8 wherein a washer element is combined with a screw member so as to present a fastener unit with a wire terminal clamped in position.
Figure 9:
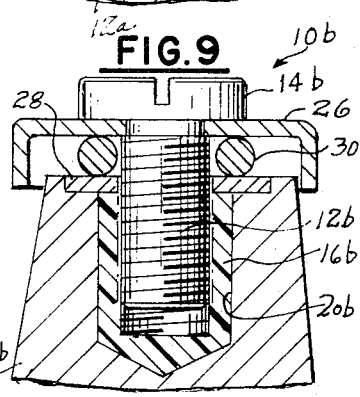

FIGS. 7, 8 and 9 disclose a further modified form of fastener contemplated by the present invention, said fastener being designated generally by the numeral 10b. The fastener 10b, like the previously described fastener 10a, includes a threaded shank member 12b and a head section 14b. The entering extremity of the shank 12b is encapsulated by an adhesive 16b, which, like the previously described adhesive section 16a is carried as a unit with the screw shank. Before application of the adhesive section or cover 16b, to the screw shank 12b a washer member 26 is telescopically associated with the fastener shank and is held against axial displacement with respect to said shank by the rolled thread convolution adjacent the clamping side of the screw head 14b. It should also be understood that the screw shank 12b is provided with a coating of mold release material similar to the previously described material 18 and 18a.

The fastener 10b has a very practical application for use with electrical terminals. A second washer member 28 may also be trapped between the adhesive section 16b and the underside of the washer 26. As shown in FIG. 7, the entering extremity of the shank 12b and the adhesive section 16b associated therewith, may be inserted within an aperture 20b of a workpiece 22b. The partially cured section 16b may then be subjected to heat so as to flow within the aperture 20b and eventually occupy the position shown in FIG. 8. The completely or fully cured epoxy resin lockingly impinges the surface of the workpiece defining the aperture 20b and an internal thread complemental to the external thread of the screw member 12b is also formed. Upon solidification of the adhesive, the screw shank may be removed due to the presence of the mold release material on the periphery of the screw thread convolutions. A terminal wire 30 as shown in FIG. 9, may be clamped in position by reinsertion of the screw shank. silicone compounds have been found satisfactory as release material for use with epoxy resins. The silicone coating on a metallic screw shank provides an effective heat resistant lubricant.

It will be apparent from the foregoing that the present invention contemplates a novel fastener device comprising a screw shank, an encapsulating covering or section of adhesive material having the functional characteristics of an epoxy resin, and a coating of mold release material provided along the threaded periphery of the screw shank to prevent locking impingement of the adhesive therewith when said adhesive is transformed into a C stage of reaction. It will also be apparent that the present invention has a very particular and practical application in instances where the workpiece is of relatively soft material and hence a tougher or harder material is necessary to accommodate a fastener screw shank. The invention also contemplates the aforesaid expeditious method of conditioning a workpiece to accommodate a threaded screw shank. The above-described novel and practical fastener and method of applying same to an apertured workpiece may be employed in a wide variety of applications. In the foregoing description, reference has been made to an epoxy of the thermo-setting type which may be transformed through stages A, B and C. The present invention also contemplates the use of thermo plastic adhesive material. Thus, instead of cross-linking into a C stage, as described above, the material would cool and solidify to produce a hard tough section having the same functional characteristics as the C stage epoxy.

I claim:

1. A preassembled screw-type threaded fastener unit capable of providing a removable threaded connection to a workpiece, the fastener including a threaded shank section, a head at one extremity thereof, an adhesive portion encapsulating the thread convolutions of said shank section and threadingly engaged therewith, the adhesive portion being heat activable and carried by the threaded shank section in a relatively dry state, a mold release compound interposed between the thread convolutions and internal thread convolutions formed in the adhesive portion to prevent the establishment of a bond between the adhesive portion and the thread convolutions of the threaded shank portion when the adhesive portion has been subjected to suitable heat and cured within a preformed aperture in a workpiece which has a structural quality which does not readily lend itself to the direct formation of threads therein.

2. A fastener unit as set forth in claim 1, having a work engaging head, a washer member positioned beneath the clamping side of said head and secured against axial separation from the fastener shank by the rolled thread convolution adjacent the head, a second washer member located between the first washer member and the adhesive portion being free to pass over the thread convolutions of the threaded shank section but retained on the fastener unit by the adhesive portion.

3. A preassembled screw-type threaded fastener unit capable of providing a removable threaded connection to a workpiece, the fastener including a threaded shank section, a head at one extremity thereof, an adhesive portion encapsulating thread convolutions of said shank section and threadingly engaged therewith, the adhesive portion being heat activable and carried by the threaded shank section in a relatively dry state, a mold release compound interposed between the thread convolutions and internal thread convolutions formed in the adhesive portion to prevent the establishment of a bond between the adhesive portion and the thread convolutions of the threaded shank portion when the adhesive portion has been subjected to suitable heat and cured within a preformed aperture in a workpiece which has a structural quality which does not readily lend itself to the direct formation of threads therein, wherein the encapsulated extremity of the shank section is tapered toward the entering end thereof, the adhesive portion extending a limited axial extent upwardly on the shank section from the entering end thereof and including wall portions of decreasing thickness from the entering end of the shank upwardly on the shank section and forming a complementary tapered recess which allows the fastener to force the lower portion of the adhesive portion to flare outwardly and effectively increase the outer diameter of the adhesive portion as the shank section moves downwardly relative to the adhesive portion.

* * * * *